United States Patent
Xu et al.

(10) Patent No.: US 12,154,318 B2
(45) Date of Patent: Nov. 26, 2024

(54) IMAGE RECOGNITION METHOD, READABLE STORAGE MEDIUM, AND IMAGE RECOGNITION SYSTEM

(71) Applicant: Hangzhou Ruisheng Software Co., Ltd., Zhejiang (CN)

(72) Inventors: Qingsong Xu, Zhejiang (CN); Qing Li, Zhejiang (CN)

(73) Assignee: Hangzhou Ruisheng Software Co., Ltd., Zhejiang (CN)

( * ) Notice: Subject to any disclaimer, the term of this patent is extended or adjusted under 35 U.S.C. 154(b) by 0 days.

(21) Appl. No.: 18/560,401

(22) PCT Filed: May 9, 2022

(86) PCT No.: PCT/CN2022/091716
§ 371 (c)(1),
(2) Date: Nov. 13, 2023

(87) PCT Pub. No.: WO2022/237726
PCT Pub. Date: Nov. 17, 2022

(65) Prior Publication Data
US 2024/0249501 A1    Jul. 25, 2024

(30) Foreign Application Priority Data
May 13, 2021   (CN) .......................... 202110522915.9

(51) Int. Cl.
*G06V 10/764*   (2022.01)
*G06F 18/24*    (2023.01)
(Continued)

(52) U.S. Cl.
CPC ............ *G06V 10/764* (2022.01); *G06F 18/24* (2023.01); *G06F 18/2433* (2023.01);
(Continued)

(58) Field of Classification Search
CPC ...... G06V 10/255; G06V 10/70; G06V 10/74; G06V 10/75; G06V 10/7625;
(Continued)

(56) References Cited

U.S. PATENT DOCUMENTS 10,592,550 B2 *   3/2020   Benboubakeur ..... G06V 10/776
11,037,029 B2 *   6/2021   Jiang ..................... G06V 10/82
(Continued)

FOREIGN PATENT DOCUMENTS

CN   108171274   6/2018
CN   111191590   5/2020
(Continued)

OTHER PUBLICATIONS

"International Search Report (Form PCT/ISA/210) of PCT/CN2022/091716", mailed on Aug. 5, 2022, with English translation thereof, pp. 1-4.
(Continued)

*Primary Examiner* — Eric Rush
(74) *Attorney, Agent, or Firm* — JCIPRNET

(57) ABSTRACT

An image recognition method, readable storage medium, and image recognition system are provided. The method includes: inputting an image, running a recognition engine to recognize and obtain species of a content in the image and obtain species recognition result, and running a non-category engine to determine whether the content belongs to a non-preset category; ignoring determination result of the non-category engine and obtaining category recognition result that the content belongs to a preset category if confidence of species recognition result is not less than first preset; obtaining category recognition result that the content belongs to the preset category if confidence of species recognition result is less than first preset and determination result of the non-category engine is no; obtaining category
(Continued)

recognition result that the content belongs to the non-preset category if confidence of species recognition result is less than first preset and determination result of the non-category engine is yes.

11 Claims, 1 Drawing Sheet

(51) Int. Cl.
*G06F 18/2433* (2023.01)
*G06F 18/25* (2023.01)
*G06V 10/75* (2022.01)
*G06V 10/80* (2022.01)
*G06V 40/16* (2022.01)
*G06V 10/774* (2022.01)

(52) U.S. Cl.
CPC ............ *G06F 18/254* (2023.01); *G06V 10/75* (2022.01); *G06V 10/765* (2022.01); *G06V 10/809* (2022.01); *G06V 40/16* (2022.01); *G06V 10/774* (2022.01)

(58) Field of Classification Search
CPC .. G06V 10/764; G06V 10/765; G06V 10/774; G06V 10/7747; G06V 10/7753; G06V 10/80; G06V 10/809; G06V 10/82; G06V 20/10; G06V 20/182; G06V 20/188; G06V 20/60; G06V 20/68; G06V 40/10; G06V 40/16; G06V 2201/07; G06V 2201/08; G06F 18/20; G06F 18/21; G06F 18/214; G06F 18/2148; G06F 18/23; G06F 18/231; G06F 18/24; G06F 18/243; G06F 18/2431; G06F 18/24317; G06F 18/24323; G06F 18/2433; G06F 18/24765; G06F 18/25; G06F 18/254; G06T 2207/20076; G06T 2207/20081; G06T 2207/20084; G06T 2207/30128; G06T 2207/30161; G06T 2207/30181; G06T 2207/30184; G06T 2207/30188; G01N 33/0098; G01N 33/02; G01N 33/025; G01N 33/12; G01N 33/46; G01N 2021/8466
USPC ........ 382/100, 103, 109, 110, 141, 155–160, 382/181, 224–229, 115, 118, 128, 133, 382/135, 136, 165, 170; 348/89, 91; 702/19; 706/15, 16, 18, 20, 21, 45–48, 706/55; 707/722, 723, 736–740, 748, 707/771, 776–778
See application file for complete search history.

(56) References Cited

U.S. PATENT DOCUMENTS

| | | | |
|---|---|---|---|
| 11,423,645 B2* | 8/2022 | Croxford | ............... G06V 10/82 |
| 11,450,117 B2* | 9/2022 | Goel | ..................... G06V 10/82 |
| 11,682,201 B2* | 6/2023 | Porcel Magnusson | ..................... G06V 20/176 382/103 |
| 11,960,531 B2* | 4/2024 | Bastiman | ........... G06V 10/7625 |
| 2018/0204562 A1 | 7/2018 | Gong et al. | |
| 2018/0322353 A1 | 11/2018 | Ralls | |

FOREIGN PATENT DOCUMENTS

| | | |
|---|---|---|
| CN | 111814810 | 10/2020 |
| CN | 113239804 A | 8/2021 |
| CN | 113239804 B | 6/2023 |

OTHER PUBLICATIONS

"Written Opinion of the International Searching Authority (Form PCT/ISA/237) of PCT/CN2022/091716", mailed on Aug. 5, 2022, with English translation thereof, pp. 1-5.
"Office Action of China Counterpart Application", issued on Jun. 28, 2022, p. 1-p. 8.
"Office Action of China Counterpart Application", issued on Mar. 16, 2023, p. 1-p. 6.

* cited by examiner

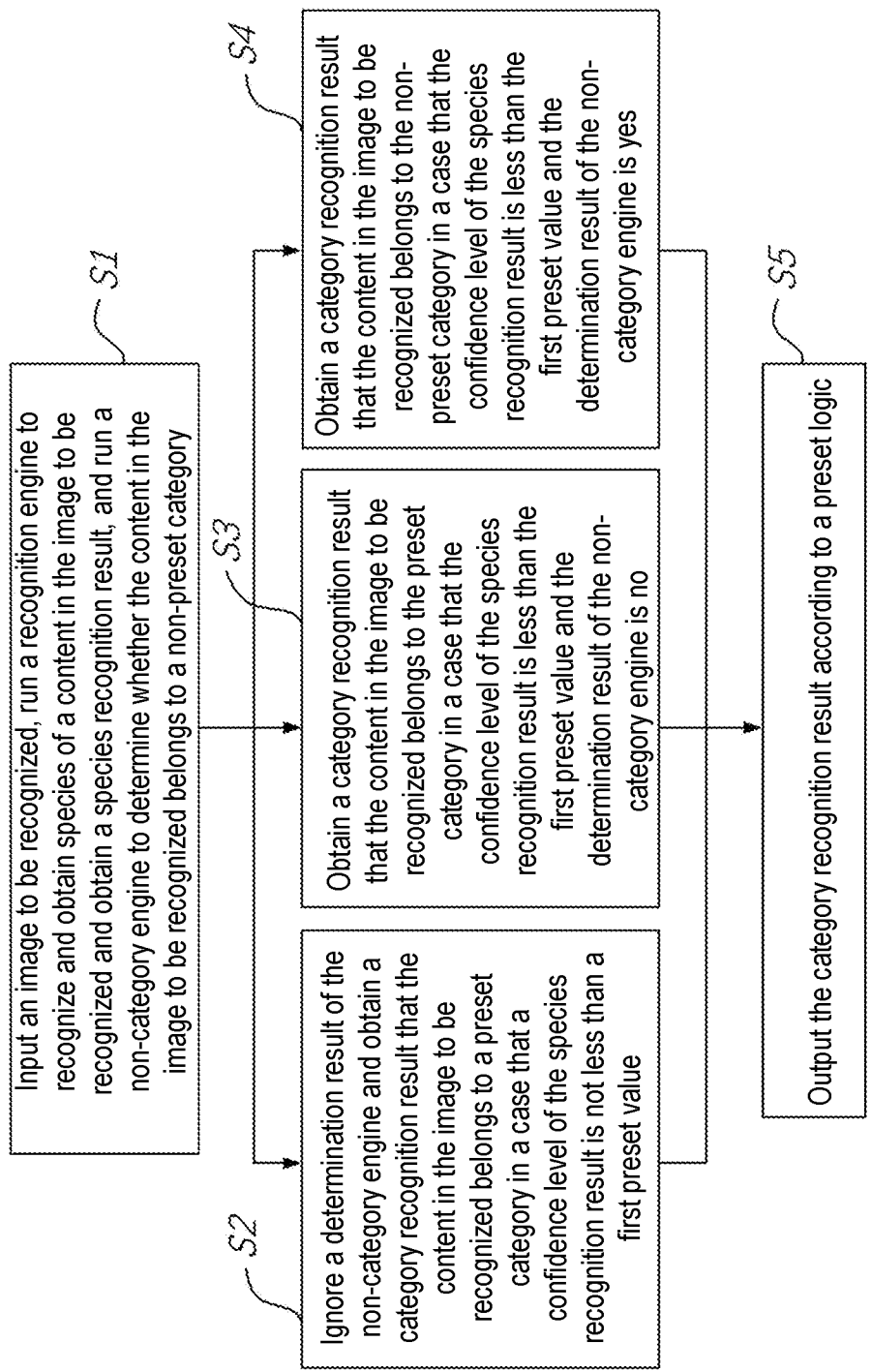

IMAGE RECOGNITION METHOD, READABLE STORAGE MEDIUM, AND IMAGE RECOGNITION SYSTEM

CROSS-REFERENCE TO RELATED APPLICATION

This application is a 371 of international application of PCT application serial no. PCT/CN2022/091716, filed on May 9, 2022, which claims the priority benefit of China application no. 202110522915.9, filed on May 13, 2021. The entirety of each of the above mentioned patent applications is hereby incorporated by reference herein and made a part of this specification.

FIELD OF THE INVENTION

The invention relates to the technical field of object recognition, and in particular to an image recognition method, a readable storage medium, and an image recognition system.

DESCRIPTION OF RELATED ART

In some object recognition applications, users take pictures of many other images in the application that are not expected to be supported. For example, in an application that recognizes a certain category, such as recognizing plants or recognizing birds (also, for example, recognizing mushrooms, fish, insects, pets, stones, etc.), animal pictures or stone pictures are input. If species identification of plants or birds is forced at this time, strange results are obtained, thus making the application look unprofessional and readily leading to issues such as complaints from users in the reviews.

SUMMARY OF THE INVENTION

The purpose of the invention is to provide an image recognition method, a readable storage medium, and an image recognition system to solve the issues that arise when existing object recognition programs identify species that are not expected to be supported.

In order to solve the above technical issues, according to the first aspect of the invention, an image recognition method is provided, including:

inputting an image to be recognized, running a recognition engine to recognize and obtain species of a content in the image to be recognized and obtain a species recognition result, and running a non-category engine to determine whether the content in the image to be recognized belongs to a non-preset category;

ignoring a determination result of the non-category engine and obtaining a category recognition result that the content in the image to be recognized belongs to a preset category in a case that a confidence level of the species recognition result is not less than a first preset value;

obtaining a category recognition result that the content in the image to be recognized belongs to the preset category in a case that the confidence level of the species recognition result is less than the first preset value and the determination result of the non-category engine is no;

obtaining a category recognition result that the content in the image to be recognized belongs to the non-preset category in a case that the confidence level of the species recognition result is less than the first preset value and the determination result of the non-category engine is yes;

and outputting the category recognition result according to a preset logic.

Optionally, in the image recognition method, the non-category engine is trained according to an image content marked with information indicating whether the image content is the non-preset category.

Optionally, in the image recognition method, the recognition engine is trained according to an image content marked with species information.

Optionally, the image recognition method further includes: determining whether a number of categories of the content in the image to be recognized is two or more, and if so, and at least one of the categories is a redundant category that needs to be excluded, then excluding the redundant category in the image to be recognized after the image to be recognized is input.

Optionally, in the image recognition method, the redundant category includes a human face.

Optionally, in the image recognition method, a determination and a recognition of the redundant category are processed using a face recognition engine.

Optionally, in the image recognition method, for the image to be recognized, in a case that the recognition engine obtains two or more species recognition results, confidence levels of the two or more species recognition results are sorted from high to low;

the preset logic comprises: excluding the category recognition result that the confidence level is less than a second preset value; wherein the second preset value is less than the first preset value.

Optionally, in the image recognition method, the preset category is determined according to an input or a preset.

Optionally, in the image recognition method, the preset category is determined according to the input, in a case that the output category recognition result includes that the content in the image to be recognized belongs to the non-preset category, the image recognition method also includes prompting to re-enter the preset category, and re-recognizing the image to be recognized according to the re-entered preset category.

Optionally, in the image recognition method, the preset category is a plant.

Optionally, in the image recognition method, before running the recognition engine and running the non-category engine, the image recognition method includes: calling a general species recognition engine to perform a recognition processing on the image to be recognized to obtain the preset category.

To solve the above technical issues, according to the second aspect of the invention, a readable storage medium is further provided, on which a program is stored, wherein when the program is executed, the above image recognition method is implemented.

In order to solve the above technical issues, according to the third aspect of the invention, an image recognition system is also provided, including a processor and the readable storage medium above, and when a program on the readable storage medium is executed by the processor, the image recognition method above is implemented.

Based on the above, in the image recognition method, the readable storage medium, and the image recognition system provided by the invention, the image recognition method includes: inputting an image to be recognized, running a recognition engine to recognize and obtain species of a content in the image to be recognized and obtain a species recognition result, and running a non-category engine to determine whether the content in the image to be recognized belongs to a non-preset category; ignoring a determination result of the non-category engine and obtaining a category recognition result that the content in the image to be recognized belongs to a preset category in a case that a confidence level of the species recognition result is not less than a first preset value; obtaining a category recognition result that the content in the image to be recognized belongs to the preset category in a case that the confidence level of the species recognition result is less than the first preset value and the determination result of the non-category engine is no; obtaining a category recognition result that the content in the image to be recognized belongs to the non-preset category in a case that the confidence level of the species recognition result is less than the first preset value and the determination result of the non-category engine is yes; and outputting the category recognition result according to a preset logic.

In this configuration, via the settings of the recognition engine and the non-category engine, based on the comparison result of the confidence level of the species recognition result of the recognition engine and the first preset value, combined with the determination result of the non-category engine, the recognition result of whether the preset category of the image to be recognized is the preset category may be obtained more accurately. Issues caused by existing object recognition programs recognizing species that are not expected to be supported are overcome.

BRIEF DESCRIPTION OF THE DRAWINGS

Those of ordinary skill in the art will understand that the drawings are provided for a better understanding of the invention and do not constitute any limitation on the scope of the invention. In particular:

FIGURE is a flowchart of an image recognition method of an embodiment of the invention.

DESCRIPTION OF THE EMBODIMENTS

In order to make the purpose, advantages, and features of the invention clearer, the invention will be further described in detail below with reference to the accompanying drawings and specific embodiments. It should be noted that the drawings are in a very simplified form and are not drawn to scale, and are only used to conveniently and clearly assist in explaining the embodiments of the invention. In addition, the structures shown in the drawings are often part of the actual structure. In particular, each drawing needs to display different emphasis, and sometimes adopts different proportions.

As used in this specification, the singular forms "a". "an", and "the" include plural referents, the term "or" is generally used to include "and/or", the term "several" is generally used to include "at least one", the term "at least two" is generally used to include "two or more" and, furthermore, the terms "first", "second", and "third" are used for descriptive purposes only, and may not be understood as indicating or implying the relative importance or implicitly indicating the quantity of the technical features indicated. Thus, features defined as "first", "second", and "third" may explicitly or implicitly include one or at least two of these features. For those of ordinary skill in the art, the specific meanings of the above terms in this specification may be understood according to specific circumstances.

The purpose of the invention is to provide an image recognition method, a readable storage medium, and an image recognition system to solve the issues that arise when existing object recognition programs recognize species that are not expected to be supported.

Description will be made below with reference to the drawings.

The inventor found that based on the description of the background art, existing object recognition applications often produce some erroneous recognition determinations when obtaining images that are not expected to be supported. The inventor randomly selected 5,000 to 10,000 images as input for testing in an existing object recognition engine, and marked the correct results on the images. The test results obtained are shown in Table 1 below:

TABLE 1

|  | Bird | Fish | Insect | Mushroom |  |
| --- | --- | --- | --- | --- | --- |
| True/True | 3691 | 3778 | 3631 | 4493 | It's xx, and engine says it's xx |
| True/False | 716 | 330 | 692 | 132 | It's not xx, but engine says it's xx |
| False/True | 99 | 261 | 122 | 72 | It's xx, but engine says it's not xx |
| False/False | 487 | 623 | 552 | 289 | It's not xx, and engine says it's not xx |

It should be understood that xx in Table 1 represents the recognized category. Table 1 exemplarily represents the object recognition of four categories: bird, fish, insect, and mushroom. It is understandable that a better object recognition engine should satisfy: False/True must be low, otherwise there may be lower recognition efficiency; and there should be low True/False, otherwise there may be a higher error rate and the recognition engine is not as useful.

Based on the above research, the inventor found that simply using a single recognition engine is difficult to overcome the recognition of objects of non-supported categories. To address the above issues, the invention provides an image recognition method. Please refer to FIGURE, which is a flowchart of an image recognition method of an embodiment of the invention. This method may be implemented in an application (app) installed on a smart terminal such as a mobile phone or a tablet, or in an application installed on an equipment such as a computer. The invention does not limit the implementation of this method. It should be noted that the images referred to in the invention not only include static pictures or picture groups formed by several frames of pictures, but may also include dynamic videos or images, etc. The invention does not limit the specific form of the images.

As shown in FIGURE, the image recognition method includes:

step S1: inputting an image to be recognized, running a recognition engine to recognize and obtain species of a content in the image to be recognized and obtain a species recognition result, and running a non-category engine to determine whether the content in the image to be recognized belongs to a non-preset category;

step S2: ignoring a determination result of the non-category engine and obtaining a category recognition result that the content in the image to be recognized belongs to a preset category in a case that a confidence level of the species recognition result is not less than a first preset value;

step S3: obtaining a category recognition result that the content in the image to be recognized belongs to the preset category in a case that the confidence level of the species recognition result is less than the first preset value and the determination result of the non-category engine is no;

step S4: obtaining a category recognition result that the content in the image to be recognized belongs to the non-preset category in a case that the confidence level of the species recognition result is less than the first preset value and the determination result of the non-category engine is yes;

and, step S5: outputting the category recognition result according to a preset logic.

Optionally, in some examples, when the image to be recognized is input in step S1, the image uploaded and input by the user or the image captured by the user may be directly obtained. In some other examples, after a user instruction is received, corresponding prompt information may be generated and output to prompt the user to upload images.

The following uses a specific example to illustrate the concepts of species and preset categories. In a specific example, the preset category is plants and the species is *Ginkgo biloba*. It is understood that *Ginkgo biloba* is a type of plant, and plants are a large collection. *Ginkgo biloba* is a subset of the plant collection, that is, species is a subset of the preset category. It should be further noted that the subset here is not limited to a proper subset, that is, a preset category may also only include one species.

Optionally, the non-category engine is trained according to image content marked with information about whether the image content is a non-preset category; and the recognition engine is trained according to image content marked with information about species. Building a recognition engine is not the same as building a non-category engine. The following also takes plants as an example. The non-category engine may use image content as training samples for training, and the image content used as training samples is directly marked for whether the image content is a plant. The non-category engine trained in this way may recognize whether the preset category in the image is a plant. The recognition engine may also use image content as training samples for training, but unlike the training samples of the non-category engine, the image content used as training samples of the recognition engine is marked with specific plant species, such as *Ginkgo biloba*, rose, etc. The recognition engine thus trained may identify species in images.

Optionally, those skilled in the art may train the non-category engine and the recognition engine according to existing training models, such as a neural network model which may specifically be a convolutional neural network model or a residual network model to train the non-category engine and the recognition engine. The convolutional neural network model is a deep feed-forward neural network using convolution kernels to scan the image to be recognized, extract the content features to be recognized in the image to be recognized, and then identify the content features. In addition, in the process of recognizing the image to be recognized, the original image may be directly input into the convolutional neural network model without preprocessing the image. Compared with other recognition models, the convolutional neural network model has higher recognition accuracy and recognition efficiency. Compared with the convolutional neural network model, the residual network model also has an identity mapping layer to avoid the phenomenon of accuracy saturation or even decline as the network depth (number of stacked layers in the network) is increased. The identity mapping function of the identity mapping layer in the residual network model needs to satisfy: the sum of the identity mapping function and the input of the residual network model is equal to the output of the residual network model. After the introduction of identity mapping, the residual network model changes the output more significantly, so the recognition accuracy and the recognition efficiency of species and preset categories may be significantly improved.

It is understandable that since the recognition engine is not 100% reliable in recognizing species and has a certain possibility of error, the probability that the species recognition result recognized by the recognition engine is consistent with the corresponding real species type (that is, the degree of confidence that the species recognition result is close to the real species) is called confidence level. It is easy to understand that in a case that the confidence level is closer to 1, the species recognition result recognized by the recognition engine is closer to the corresponding real species type, and the species recognition result thereof is more credible, and in a case that the confidence level is closer to 0, the species recognition result recognized by the recognition engine is less credible.

Optionally, considering the False/True and True/False setting goals of the image recognition method, the first preset value may be set and adjusted according to different applications (apps) and the actual conditions of each application (app). For example, the first preset value may be set to a value between 0.3 and 0.5.

Preferably, in the image recognition method, the preset category is determined according to an input or a preset. For example, using an interactive method, the user first selects and determines one preset category, and then performs the above steps for image recognition. In some embodiments, the user chooses to call the corresponding recognition engine and non-category engine for processing. For example, when the current user thinks that what he is photographing is a plant, plants may be used as the preset category, and clicking to select plant recognition calls the plant recognition engine and non-plant engine for recognition. In some other embodiments, the preset category may be determined according to presets. For example, in a case that the application is mainly used for plant recognition, the plants may be determined as the preset category via a software preset.

Taking the first preset value as 0.3 and recognizing plants as the preset category as an example, the above step S1 to step S4 are explained in conjunction with Table 2 below:

TABLE 2

|  | None xx engine: No | None xx engine: Yes |
| --- | --- | --- |
| ID engine ≥0.3 | xx | xx |
| ID engine <0.3 | xx | None xx |

In particular, ID engine represents the recognition engine, None xx engine represents the non-category engine, and xx is the preset category. First, a recognition engine and a non-category engine corresponding to the preset category are established. For the image to be recognized, two engines, the recognition engine and the non-category engine, are run respectively.

When the confidence level of the species recognition result of the recognition engine is not less than 0.3, in a case that the determination result of the non-category engine is no (that is, not a non-plant), then the category recognition result is obtained that the content in the image to be recognized belongs to the preset category (that is, the category recognition result is: the content in the image belongs to plants); in a case that the determination result of the non-category engine is yes (that is, the image to be recognized is considered to be a non-plant), since the confidence level is not less than 0.3, there is a certain degree of authenticity. In order to reduce False/True, the determination results of the non-category engine may be ignored to still obtain the category recognition result that the content in the image to be recognized belongs to the preset category (that is, the category recognition result is still: the content in the image belongs to plants).

When the confidence level of the species recognition result of the recognition engine is less than 0.3, in a case that the determination result of the non-category engine is no (that is, not a non-plant), then the category recognition result is obtained that the content in the image to be recognized belongs to the preset category (that is, the category recognition result is: the content in the image belongs to plants); although the species recognition result of the recognition engine has a lower confidence level and is relatively unreliable, the recognition engine is only for the recognition of a certain specific species, and the result thereof does not necessarily mean that the content of the image is not a plant. Accordingly, in a case that the determination result of the non-category engine is no (that is, not a non-plant), the category recognition result that the content in the image to be recognized belongs to the preset category (that is, the category recognition result is: the content in the image belongs to a plant) is directly obtained.

When the confidence level of the species recognition result of the recognition engine is less than 0.3, in a case that the determination result of the non-category engine is yes (that is, the image to be recognized is considered to be a non-plant), since the confidence level is already lower, the species recognition result of the recognition engine is less authentic for a certain plant species. At the same time, the non-category engine determines that the image to be recognized is not a plant, that is, a category recognition result that the content in the image to be recognized belongs to a non-preset category is obtained (that is, the category recognition result is: the content in the image belongs to non-plants).

Further, via step S5, after the recognition result of the image is obtained, the category recognition result is output according to the preset logic. The category recognition result being output according to the preset logic here may be that the category recognition result is directly output, for example, the category recognition result obtained in step S1 to step S4 is output as prompt information. In an alternative example, the image to be recognized is photographed by the user, and the output prompt information may be: "the image photographed by the user is not a plant" Furthermore, in a case that the obtained category recognition result includes that the content in the image to be recognized belongs to the preset category, in addition to outputting the category recognition result, such as "the image taken by the user is a plant"; the recognized species recognition result may also be further output, such as "the image taken by the user is *Ginkgo biloba*". That is, in a case that the obtained category recognition result includes that the content in the image to be recognized belongs to the preset category, the image recognition method may further include outputting the information of the species recognition result.

Preferably, the image recognition method further includes: determining whether a number of categories of the content in the image to be recognized is two or more, and if so, and at least one of the categories is a redundant category that needs to be excluded, then excluding the redundant category in the image to be recognized after the image to be recognized is input. In some cases, for example, the image to be recognized is taken by the user, and often contains redundant content in the image, such as a person holding a plant, and the preset or input preset category is plants. At this time, people are redundant content and should be excluded to avoid the impact thereof on the final category recognition result.

More preferably, the redundant category includes a human face. This is because users more often take pictures of human faces. Optionally, the determination and the recognition of the redundant category are processed by a face recognition engine. When recognizing images, a face recognition engine may be added to quickly distinguish the user's behavior of photographing faces. In a case that the image to be recognized contains a human face, it is readily recognized as a human face and excluded, for example, situations such as a person holding a plant or flower, a person carrying a fish, a person carrying a birdcage, a person holding a dog, a person holding a cat, etc. At this time, it is necessary to exclude the face recognition results and retain the desired preset categories for recognition.

In some embodiments, for the image to be recognized, the recognition engine may not only obtain a unique species recognition result, but may obtain two or more species recognition results. For example, in an example, the user captured an image of a certain tree and after recognition by the recognition engine, two species recognition results are obtained: 1) *Ginkgo biloba;* 2) Bodhi. Since the tree shapes of *Ginkgo biloba* and Bodhi are similar, the shape of the leaves are also similar. Optionally, the recognition engine may provide corresponding confidence levels for the two species recognition results. Preferably, in order to output more accurate information, the two or more species recognition results may be sorted in order from high to low confidence levels, with the first ranked species recognition result having the highest confidence level, which in the specification is also called "Top 1 recognition result". The species recognition result ranked second is called "Top 2 recognition result", and the species recognition result ranked third is called "Top 3 recognition result", and so on.

Furthermore, the preset logic includes: excluding the category recognition result that the confidence level is less than a second preset value; wherein the second preset value is less than the first preset value. The second preset value here may be set and adjusted according to different applications (apps) and the actual conditions of each application (app). For example, the second preset value may be set to 0.1. Based on two or more species recognition results, combined with the determination results of the non-category engine, species recognition results with lower confidence levels and the corresponding category recognition results thereof are excluded, thus providing users with more realistic recognition results and effectively avoiding outputting erroneous results to users.

In some embodiments, the preset logic of step S5 may include: retaining only the Top 1 recognition result and ignoring Top 2 and subsequent recognition results. Since the Top 1 recognition result is the recognition result with the highest confidence level and the result thereof is relatively more credible, the Top 1 recognition result may be retained while the other recognition results are excluded.

Furthermore, the preset logic is determined according to the relationship between the confidence level of the category recognition result and the second preset value, the third preset value, or the fourth preset value, wherein the fourth preset value>the third preset value>the second preset value. Determining the preset logic according to the relationship between the confidence level and the second preset value, the third preset value, or the fourth preset value may effectively avoid outputting erroneous results to the user.

Preferably, the fourth preset value is configured as high confidence level, the third preset value is configured as higher confidence level, and the second preset value is configured as low confidence level. Those skilled in the art may adjust and set the specific values of the second preset value, the third preset value, and the fourth preset value according to actual conditions. In one alternative example, the fourth preset value is 0.8, the third preset value is 0.5, and the second preset value is 0.1. That is, when the confidence level is not less than 0.8, the confidence level may be considered to be very high; when the confidence level is between 0.5 and 0.8, the confidence level may be considered to be higher; when the confidence level is between 0.1 and 0.5, the confidence level may be considered as average; and when the confidence level is less than 0.1, the confidence level may be considered as low.

In some embodiments, in a case that the confidence levels of the top N recognition results ranked by confidence levels are all less than the fourth preset value and not less than the third preset value, if there is a recognition result after the Nth recognition result and the confidence level of the recognition result after the Nth recognition result is less than the second preset value, the step of performing a preset operation on the recognition result according to the preset logic includes: ignoring the recognition results after the Nth recognition result and retaining the top N recognition results; if there is no recognition result after the Nth recognition result, the step of performing the preset operation on the recognition result according to the preset logic includes: retaining the top N recognition results; wherein N is a natural number not less than 2.

As an example, N=2 and three recognition results are obtained from step S1 to step S4. At this time, the top two recognition results ranked by confidence level are the Top 1 and Top 2 recognition results respectively. The Top 1 and Top 2 recognition results both have higher confidence levels. At this time, there is a third recognition result, that is, the Top 3 recognition result, and the confidence level of the Top 3 recognition result is low. At this time, the preset logic retains the first two recognition results (that is, retains the Top 1 and Top 2 recognition results) and ignores the third recognition result (that is, ignores the Top 3 recognition result). In a case that the confidence levels of the Top 1 and Top 2 recognition results are higher, the credibility of the recognition results is higher, while at the same time the confidence level of the Top 3 recognition result is low. At this time, the Top 3 recognition result should be excluded to improve the accuracy.

It should be noted that in the above steps, there are recognition results after the Nth recognition result. The confidence level of the recognition results after the Nth recognition result being less than the second preset value does not limit the confidence level of the N+1th recognition result to be less than the second preset value, and instead the confidence level of the N+2nd or N+3rd . . . etc. recognition result may be less than the second preset value. For example, taking N=2 as an example, in a case that step S1 to step S4 produce 5 recognition results, the Top 1 and Top 2 recognition results ranked in the top two both have higher confidence levels, and the Top 4 and Top 5 recognition results both have low confidence. However, the degree of the confidence level of the Top 3 recognition result is not limited. At this time, the preset logic retains the first two recognition results (that is, retains the Top 1 and Top 2 recognition results), and ignores the 4th and 5th recognition results (that is, ignores the Top 4 and Top 5 recognition results). The Top 3 recognition result at this time may be retained or ignored according to the actual situation, and the present embodiment is not limited in this regard.

In some other embodiments, in a case that the confidence level of the top M recognition results ranked by confidence level is not less than the fourth preset value, if there is a recognition result after the Mth recognition result, the step of performing the preset operation on the recognition result according to the preset logic includes: ignoring the recognition results after the Mth recognition result and retaining the top M recognition results; if there is no recognition result after the Mth recognition result, the step of performing the preset operation on the recognition result according to the preset logic includes: retaining the top M recognition results; wherein M is a natural number.

As an example, M=1 and three recognition results are obtained from step S1 to step S4. At this time, the recognition result ranked first in confidence level is the Top 1 recognition result, and the confidence level of the Top 1 recognition result is very high. At this time, there are the second and third recognition results, that is, the Top2 and Top 3 recognition results. At this time, the preset logic is to retain the first recognition result (that is, retain the Top 1 recognition result), and ignore the second and third recognition results (that is, ignore the Top 2 and Top 3 recognition results). In a case that the confidence level of the Top 1 recognition result is very high, the credibility of the recognition result is very high. It is no longer necessary to refer to the Top 2 and Top 3 recognition results, and the Top 2 and Top 3 recognition results may be directly excluded.

In some other embodiments, in a case that the confidence levels of the top P recognition results ranked by confidence level are all less than the third preset value and not less than the second preset value, and at least one recognition result in the top P recognition results includes the content in the image to be recognized and belongs to the preset category, the step of performing the preset operation on the recognition result according to preset logic includes: ignoring the recognition results that the content in the image to be recognized belongs to the non-preset category, and retaining the recognition results that the content in the image to be recognized belongs to the preset category; wherein P is a natural number.

As an example, P=3 and the preset category is a plant. At this time, the recognition results ranked in the top 3 confidence levels are the Top 1. Top 2, and Top 3 recognition results. In a case that the confidence levels of the three recognition results are all general confidence levels, the credibility of the recognition results is average.

Based on the above image recognition method, the present embodiment also provides a readable storage medium with a program stored thereon. When the program is executed, the image recognition method above is implemented. The readable storage medium may be integrated into a smart terminal such as a mobile phone or a tablet or a computer, or may be attached independently. The readable storage medium may be a volatile memory or a non-volatile memory, or may include both volatile and non-volatile memories. The invention does not place any particular restrictions on the specific type of the readable storage medium.

Furthermore, the present embodiment also provides an image recognition system. The image recognition system may include a processor and the readable storage medium above. When the program on the readable storage medium is executed by the processor, the steps in the image recognition method above may be implemented. The processor may be an integrated circuit chip having signal processing capabilities. The processor may be a general-purpose processor, a digital signal processor (DSP), an application-specific integrated circuit (ASIC), a field-programmable gate array (FPGA), or other programmable logic devices, discrete gates or transistor logic devices, discrete hardware components. The invention does not place any special restrictions on the specific type of the processor. Those skilled in the art may make configurations according to actual conditions.

Based on the above, in the image recognition method, the readable storage medium, and the image recognition system provided by the invention, the image recognition method includes: inputting an image to be recognized, running a recognition engine to recognize and obtain species of a content in the image to be recognized and obtain a species recognition result, and running a non-category engine to determine whether the content in the image to be recognized belongs to a non-preset category; ignoring a determination result of the non-category engine and obtaining a category recognition result that the content in the image to be recognized belongs to a preset category in a case that a confidence level of the species recognition result is not less than a first preset value; obtaining a category recognition result that the content in the image to be recognized belongs to the preset category in a case that the confidence level of the species recognition result is less than the first preset value and the determination result of the non-category engine is no; obtaining a category recognition result that the content in the image to be recognized belongs to the non-preset category in a case that the confidence level of the species recognition result is less than the first preset value and the determination result of the non-category engine is yes; and outputting the category recognition result according to a preset logic. In this configuration, via the settings of the recognition engine and the non-category engine, based on the comparison result of the confidence level of the species recognition result of the recognition engine and the first preset value, combined with the determination result of the non-category engine, the recognition result of whether the preset category of the image to be recognized is the preset category may be obtained more accurately. Issues caused by existing object recognition programs recognizing species that are not expected to be supported are overcome.

The above description is only a description of the preferred embodiments of the invention, and does not limit the scope of the invention in any way. Any changes or modifications made by those of ordinary skill in the art based on the above disclosure shall fall within the scope of the claims.

What is claimed is:

1. An image recognition method, characterized by comprising:

step S1: inputting an image to be recognized, running a recognition engine to recognize and obtain species of a content in the image to be recognized and obtain a plurality of species recognition results, and running a non-category engine to determine whether the content in the image to be recognized belongs to a non-preset category, wherein each of the plurality of species recognition results corresponds to a confidence level;

step S2: for a species recognition result, in which the confidence level is not less than a first preset value, of the plurality of species recognition results, ignoring a determination result of the non-category engine and obtaining a category recognition result that the content in the image to be recognized belongs to a preset category;

step S3: for a species recognition result, in which the confidence level is less than the first preset value, in the plurality of species recognition results, obtaining the category recognition result that the content in the image to be recognized belongs to the preset category in a case that the determination result of the non-category engine is no;

step S4: for a species recognition result, in which the confidence level is less than the first preset value, in the plurality of species recognition results, obtaining a category recognition result that the content in the image to be recognized belongs to the non-preset category in a case that the determination result of the non-category engine is yes;

and step S5: determining whether to output the category recognition result corresponding to each of the plurality of species recognition results obtained through steps S1 to S4 according to a preset logic;

wherein the non-category engine is trained according to an image content marked with information indicating whether the image content is the non-preset category;

wherein confidence levels of the plurality of species recognition results are sorted from high to low;

the preset logic comprises: excluding a category recognition result associated with a species recognition result whose confidence level is less than a second preset value in the plurality of species recognition results; wherein the second preset value is less than the first preset value;

the preset logic is further determined according to a relationship between the confidence level of each of the plurality of species recognition results and the second preset value, a third preset value, or a fourth preset value, wherein the fourth preset value>the third preset value>the second preset value;

in a case that confidence levels ranked in a top N among the confidence levels after sorting are all less than the fourth preset value and not less than the third preset value, if there is a (N+1)th species recognition result corresponding to a (N+1) th confidence level after a Nth confidence level and the (N+1)th confidence level is less than the second preset value, a step of performing a preset operation according to the preset logic includes: ignoring the species recognition results corresponding to remaining confidence levels after the Nth confidence level in the plurality of species recognition results and retaining the species recognition results corresponding to the confidence levels ranked in the top N; if there is no (N+1)th species recognition result, the step of performing the preset operation according to the preset logic includes: retaining the species recognition results corresponding to the confidence levels ranked in the top N; wherein N is a natural number not less than 2;

in a case that confidence levels ranked in a top M among the confidence levels after sorting are not less than the fourth preset value, if there is a (M+1)th species recognition result corresponding to a (M+1)th confidence level after a Mth confidence level in the plurality of species recognition results, the step of performing the preset operation according to the preset logic includes: ignoring the species recognition results corresponding to remaining confidence levels after the Mth confidence level and retaining the species recognition results corresponding to the confidence levels ranked in the top M; if there is no (M+1)th species recognition result, the step of performing the preset operation according to the preset logic includes: retaining the species recognition results corresponding to the confidence levels ranked in the top M; wherein M is a natural number;

in a case that confidence levels ranked in a top P among the confidence levels after sorting are all less than the third preset value and not less than the second preset value, and at least one category recognition result in top P category recognition results corresponding to the confidence levels ranked in the top P includes the content in the image to be recognized belongs to the preset category, the step of performing the preset operation according to the preset logic includes: ignoring category recognition results that the content in the image to be recognized belongs to the non-preset category, and retaining the at least one category recognition result that the content in the image to be recognized belongs to the preset category; wherein P is a natural number.

2. The image recognition method of claim 1, wherein the recognition engine is trained according to an image content marked with species information.

3. The image recognition method of claim 1, wherein the image recognition method further comprises: determining whether a number of categories of the content in the image to be recognized is two or more, and if so, and at least one of the categories is a redundant category that needs to be excluded, then excluding the redundant category in the image to be recognized after the image to be recognized is input.

4. The image recognition method of claim 3, wherein the redundant category comprises a human face.

5. The image recognition method of claim 4, wherein a determination and a recognition of the redundant category are processed using a face recognition engine.

6. The image recognition method of claim 1, wherein the preset category is determined according to an input or a preset.

7. The image recognition method of claim 6, wherein the preset category is determined according to the input, and in a case that a result output in Step 5 comprises the category recognition result that the content in the image to be recognized belongs to the non-preset category, the image recognition method further comprises prompting to re-enter the preset category, and re-recognizing the image to be recognized according to the re-entered preset category.

8. The image recognition method of claim 1, wherein the preset category is a plant.

9. The image recognition method of claim 1, wherein before running the recognition engine and running the non-category engine, the image recognition method comprises: calling a general species recognition engine to perform a recognition processing on the image to be recognized to obtain the preset category.

10. A non-transitory computer-readable storage medium, on which a program is stored, wherein when the program is executed by a processor, the image recognition method of claim 1 is implemented.

11. An image recognition system, comprising a processor and a readable storage medium on which a program is stored, wherein when the program on the readable storage medium is executed by the processor, the image recognition method of claim 1 is implemented.

* * * * *